United States Patent
Kim

(10) Patent No.: US 8,907,917 B2
(45) Date of Patent: Dec. 9, 2014

(54) LIQUID CRYSTAL DISPLAY DEVICE INTEGRATED WITH CAPACITIVE TOUCH PANEL

(75) Inventor: Cheol-Se Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 504 days.

(21) Appl. No.: 12/836,408

(22) Filed: Jul. 14, 2010

(65) Prior Publication Data

US 2011/0074727 A1    Mar. 31, 2011

(30) Foreign Application Priority Data

Sep. 29, 2009  (KR) .................... 10-2009-0092595

(51) Int. Cl.
  *G06F 3/045*  (2006.01)
  *G06F 3/044*  (2006.01)
  *G06F 3/041*  (2006.01)

(52) U.S. Cl.
  CPC .............. *G06F 3/044* (2013.01); *G06F 3/0412* (2013.01)
  USPC .......................................... 345/174; 345/104

(58) Field of Classification Search
  CPC ....... G06F 3/044; G06F 3/0412; G06F 3/045; G09G 3/36
  USPC ................. 345/174, 98, 173, 104; 178/18.05, 178/18.03
  See application file for complete search history.

(56) References Cited

U.S. PATENT DOCUMENTS

| | | | |
|---|---|---|---|
| 5,786,796 A * | 7/1998 | Takayama et al. | 345/76 |
| 8,159,466 B2 * | 4/2012 | Ma et al. | 345/173 |
| 2007/0176905 A1 * | 8/2007 | Shih et al. | 345/173 |
| 2009/0109359 A1 | 4/2009 | Shih et al. | |
| 2009/0135158 A1 * | 5/2009 | Takahashi et al. | 345/174 |

FOREIGN PATENT DOCUMENTS

CN           101446876 A       6/2009

* cited by examiner

*Primary Examiner* — Chanh Nguyen
*Assistant Examiner* — Tsegaye Seyoum
(74) *Attorney, Agent, or Firm* — McKenna Long & Aldridge LLP

(57) ABSTRACT

Disclosed is a liquid crystal display device which can sense a change of static capacitance of liquid crystals caused by a touch to detect the touch and a position of the touch, the liquid crystal display device includes, a pixel transistor on each of crossed portions of gate lines and data lines and a pixel electrode at each of the pixel regions, a liquid crystal capacitor between the pixel electrode and a common electrode, a storage line formed on the first substrate, a switching line formed in parallel to the gate line, a read out line parallel to the data line, a first storage capacitor between the storage line and the pixel transistor, a second storage capacitor and a sensing capacitor in series between the switching line and the common electrode, a switching transistor having a gate electrode connected to a contact point of the second storage capacitor and the sensing capacitor, and a drain electrode connected to the read out line.

6 Claims, 6 Drawing Sheets

US 8,907,917 B2

LIQUID CRYSTAL DISPLAY DEVICE INTEGRATED WITH CAPACITIVE TOUCH PANEL

CROSS REFERENCE TO RELATED APPLICATION

This application claims the benefit of the Patent Korean Application No. 10-2009-0092595, filed on Sep. 29, 2009, which is hereby incorporated by reference as if fully set forth herein.

BACKGROUND OF THE DISCLOSURE

1. Field of the Disclosure

The present invention relates to liquid crystal display devices, and more particularly, to a liquid crystal display device which can sense a change of static capacitance of liquid crystals caused by a touch to detect the touch and a position of the touch.

2. Discussion of the Related Art

Recently, as the times turns to a full scale information oriented age, a field of display devices which express an electric information signal visually has been developed rapidly, and, keeping pace with this, a variety of flat display devices which are thin, and light and have an excellent performance of a low power consumption have been developed, replacing the present cathode ray tubes, quickly.

As specific examples of such flat display devices, there are liquid crystal display devices LCD, plasma display panel devices PDP, field emission display devices FED, electro luminescence display device ELD, and so on, which have a flat display panel in common essentially for displaying a picture. The flat display panel has one pair of transparent insulating substrates bonded to face each other with a unique light emission material or a polarizing material layer disposed therebetween.

Of the flat display devices, the liquid crystal display device displays a picture by controlling light transmissivity of liquid crystals by using an electric field. To do this, the liquid crystal display device is provided with a display panel having liquid cells, a back light unit for directing a light to the display panel, and a driving circuit for driving the liquid cells.

The display panel has a plurality of gate lines and a plurality of data lines crossing each other to define a plurality of pixel regions. At each of the pixel regions, there are a thin film transistor array substrate and a color filter array substrate arranged to face each other, spacers for maintaining a fixed cell gap between two substrates, and liquid crystals filled in the cell gap.

The thin film transistor array substrate is provided with the gate lines and the data lines, a thin film transistor form at every crossed portion of the gate lines and the data lines as a switching device, pixel electrodes and so on each formed for each liquid cell connected to the thin film transistor, and an alignment film coated thereon throughout the thin film transistor array substrate. The gate lines and the data lines receive signals from the driving circuits through pads for gate lines and the data lines, respectively.

The thin film transistor supplies a pixel voltage signal supplied to the data line to the pixel electrode in response to a scan signal supplied to the gate line.

The color filter array substrate is provided with a color filter formed for each liquid crystal cell, a black matrix for division and reflection of an external light, a common electrode for supplying a reference voltage to the liquid crystal cells commonly, and the alignment film coated thereon throughout the color filter array substrate.

Fabrication of the display panel is finished as the thin film transistor array substrate and the color filter array substrate fabricated separately thus are aligned and bonded together, and liquid crystals are injected into and sealed between the two substrates.

Recently, requirements for addition of a touch panel to the liquid crystal display device fabricated thus are increasing, which enables to recognize a touch portion with a human hand or an input means, and provide additional information in response to the recognition. Currently, since the touch panel is applied to liquid crystal display device in a form in which the touch panel is attached to an outside surface of the liquid crystal display device, there have been efforts for mounting the touch panel in the panel of the liquid crystal display device.

The following is an example of the touch panel mounted in the liquid crystal display device for preventing a volume of the liquid crystal display device from increasing due to the attachment of the touch panel.

FIG. 1 illustrates a circuit diagram of a related art capacitance system schematically, and FIG. 2 illustrates a circuit diagram of the capacitance sensor in FIG. 1 and a driving system thereof.

Referring to FIGS. 1 and 2, a related art liquid crystal display device is provided with first and second substrates (not shown) facing each other, a liquid crystal layer (not shown) filled between the first and second substrates (not shown), a gate line Gate 11 and a data line Data 12 formed on the first substrate to cross each other to define a pixel region, and a thin film transistor TFT formed at a crossed portion of the gate line 11 and the data line 12. Formed on the second substrate, there is a common electrode (not shown) Vcom (an applied voltage) throughout an entire surface thereof, and, formed on the first substrate, there is a pixel electrode 13 at a pixel region of the first substrate.

In addition to this, the related art liquid crystal display device is provided with a first line 21 formed parallel to the gate line 11 on an outer side of the pixel region for sensing the capacitance, a second line 22 formed parallel to the data line 12, and a first reference voltage line Vref1 and a second reference voltage line Vref2 formed parallel to the first line 21 and the second line 22, respectively.

Formed between the first reference voltage line Vref1 and the first line 21, there is a first supplementary capacitor Cref1, and formed between the first reference voltage line Vref1 and the common electrode Vcom, there is a first capacitance capacitor Clc1. In this case, the first supplementary capacitor Cref1 and the first capacitance capacitor Clc1 are connected in series. The first supplementary capacitor Cref1 and the first capacitance capacitor Clc1 connected in series thus are formed for each pixel.

Alikely, formed between the second reference voltage line Vref2 and the second line 22, there is a second supplementary capacitor Cref2, and formed between the common electrode Vcom and the second line 22, there is a second capacitance capacitor Clc2. In this case too, the second supplementary capacitor Cref2 and the second capacitance capacitor Clc2 are connected in series.

By providing an amplifier 31 at a terminal as shown in FIG. 2, what is obtained of a value of a signal applied to the first line 21 is an amplified value of a voltage at a node Vn1 between the capacitance capacitor Clc 32 and the supplementary capacitor 33, for determining if there is a touch and to sense a touch position according to the amplified value. That is, a value of the capacitance capacitor Clc 32 changes if there is the touch, and, different from an initial state, the value of the capacitance capacitor Clc 32 when being touched is measured as a voltage Vout from the node Vn1 through the amplifier 31, thereby sensing a touch state and a touch position.

At the other side which is an opposite side of an output side of the capacitance capacitor and the node Vn1 of the supplementary capacitor, first and second switches sw1 and sw2 are provided for applying signal to the first and second switches sw1 and sw2, selectively.

Two common voltage values Vcomh and Vcoml are respectively applied to the first and second reference voltage lines Vref1 and Vref2 crossing each other, which are connected to one side of the first and second supplementary capacitors Cref1 and Cref2 33. When a common voltage is VcomH, a voltage Va is supplied through a first switch sw1, stored at the Clc1 32, and provided to the amplifier 31 when the common voltage is Vcoml. At the end, the voltage provided thus includes information on a Clc32 value changed thus at the time of the touch. Change of an output voltage caused by the change of the capacitance can be expressed as follows.

$$\frac{\partial V_{nl}}{\partial C_{LC}} = \frac{C_{ref}}{(C_{ref} + C_{LC})^2} \cdot (V_{comH} - V_{comL})$$

In such a configuration, wiring crossing an X-axis and Y-axis is required, and according to this, an increased parasitic capacitance is foreseen.

However, the related art liquid crystal display device which recognizes the touch by the capacitance capacitor system has the following problems.

First, since whether the touch is made or not is sensed by sensing a voltage change of one pixel point selectively, the recognition is impossible if a plurality of pixel points are touched.

Second, the wiring is crossed for sensing touch positions at the X-axis and the Y-axis, increasing a size of the panel, and, as consequence of the increased panel size, line resistance of the wiring, and parasitic capacitance between lines are increased, to increase coupling capacitance that drops an S/N (Signal to Noise) ratio, making reliability of the signal poor which makes recognition of the touch difficult.

SUMMARY OF THE DISCLOSURE

Accordingly, the present invention is directed to a liquid crystal display device.

An object of the present invention is to provide a liquid crystal display device which can recognize a capacitance change of liquid crystals caused by a touch for sensing whether a touch is made or not and a touch position.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a first substrate and a second substrate formed to face each other, a plurality of gate lines and data lines formed to cross each other on the first substrate to define pixel regions, a pixel transistor formed on each of crossed portions of the gate lines and data lines data and a pixel electrode formed at each of the pixel regions, a common electrode formed on an entire surface of the second substrate, a liquid crystal layer filled between the first and second substrates, a liquid crystal capacitor formed between the pixel electrode and the common electrode, a storage line formed on the first substrate, a switching line formed in parallel to the gate line, a read out line parallel to the data line data, a first storage capacitor formed between the storage line and the pixel transistor, a second storage capacitor and a sensing capacitor formed in series between the switching line and the common electrode, and a switching transistor having a gate electrode connected to a contact point of the second storage capacitor and the sensing capacitor, and a drain electrode connected to the read out line.

In the meantime, the switching transistor includes a source electrode connected to the storage line. Or, the switching transistor includes a source electrode connected to a separate power source voltage line.

The liquid crystal display device may further include a resistor formed between the switching line and the gate electrode of the switching transistor in parallel to the second storage capacitor. In this instance, it is preferable that a time constant is defined with a resistance value of the resistor and capacitance values of the second storage capacitor, the sensing capacitor and the switching transistor, the time constant is smaller than one frame time period and greater than an on-time period of a high signal applied to the switching line.

Further, the liquid crystal display device may further comprises a sensing spacer formed on the common electrode spaced from an uppermost surface on the first substrate, the sensing spacer is formed at a portion where the sensing capacitor is defined.

In another aspect of the present invention, a liquid crystal display device includes a first substrate and a second substrate 200 formed to face each other, a plurality of gate lines and data lines formed to cross each other on the first substrate 100 to define pixel regions, a pixel transistor formed on each of crossed portions of the gate lines and data lines and a pixel electrode formed at each of the pixel regions, a common electrode formed on an entire surface of the second substrate, a liquid crystal layer filled between the first and second substrates, a liquid crystal capacitor formed between the pixel electrode and the common electrode, a storage line formed on the first substrate, a read out line parallel to the data line, a first storage capacitor formed between the storage line and the pixel transistor, a second storage capacitor and a sensing capacitor formed in series between the gate line and the common electrode, and a switching transistor having a gate electrode connected to a contact point of the second storage capacitor and the sensing capacitor, and a drain electrode connected to the read out line.

In this instance, the switching transistor may include a source electrode connected to the storage line.

The liquid crystal display device may further include a resistor formed between the gate line and the gate electrode of the switching transistor, in parallel to the second storage capacitor. In this instance, a time constant is defined with a resistance value of the resistor and capacitance values of the second storage capacitor, the sensing capacitor and the switching transistor and the time constant is smaller than one frame time period and greater than an on-time period of a gate high signal applied to the gate line.

In the meantime, in any one of above configurations, the liquid crystal display device may further include a sensing spacer formed on the common electrode which defines the sensing capacitor spaced from an uppermost surface on the first substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

First Embodiment

Figure 1:
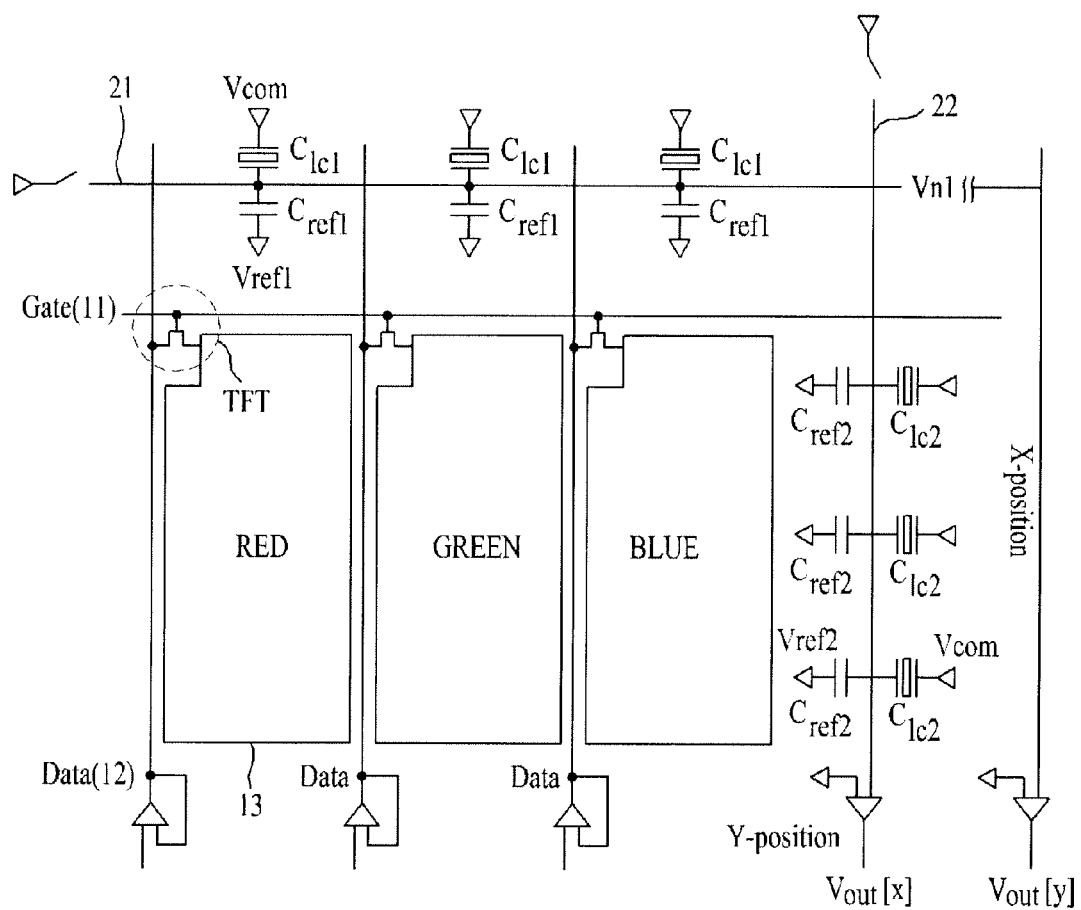
FIG. 1 illustrates a circuit diagram of a related art capacitance system schematically.
Figure 2:
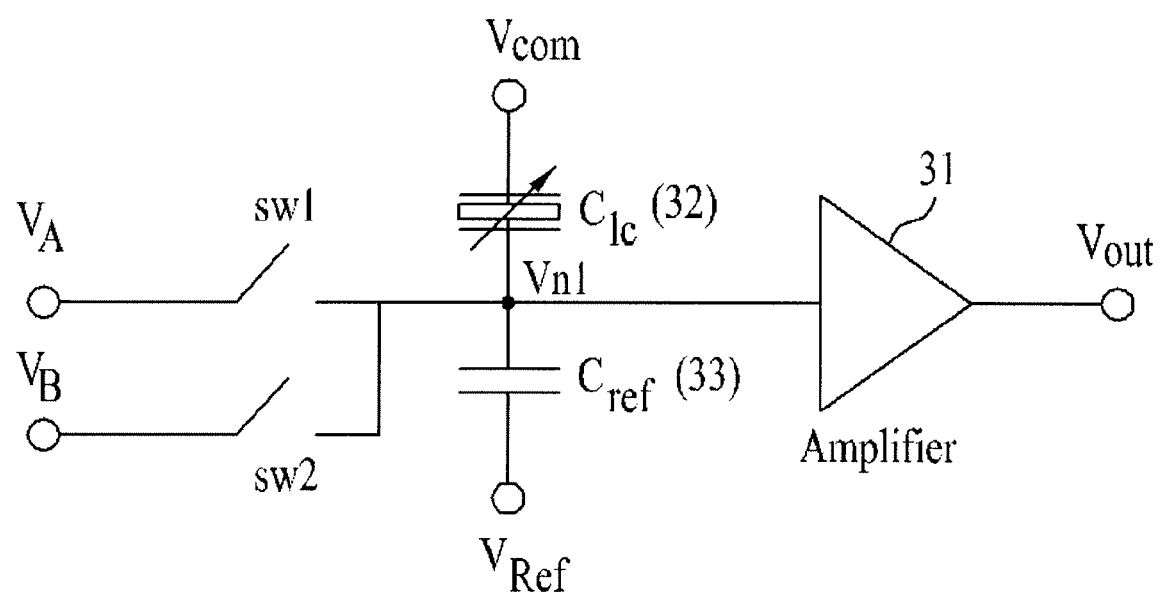
FIG. 2 illustrates a circuit diagram of the capacitance sensor in FIG. 1 and a driving system thereof.
Figure 3:
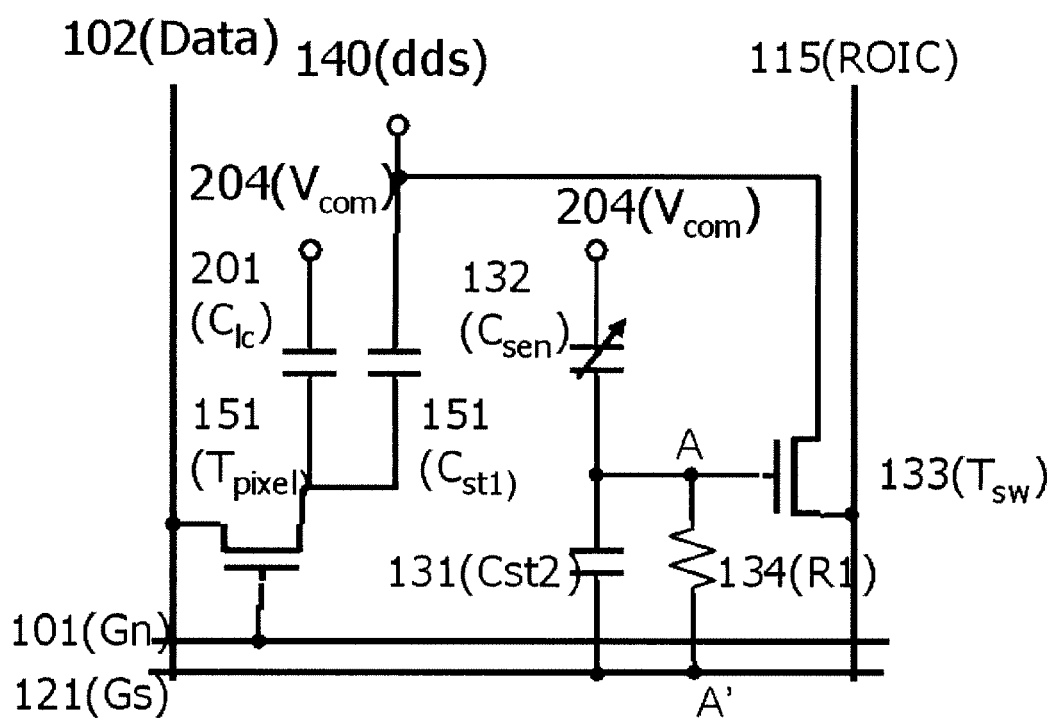
FIG. 3 illustrates a circuit diagram of a liquid crystal display device in accordance with a first embodiment of the present invention.
Figure 4:
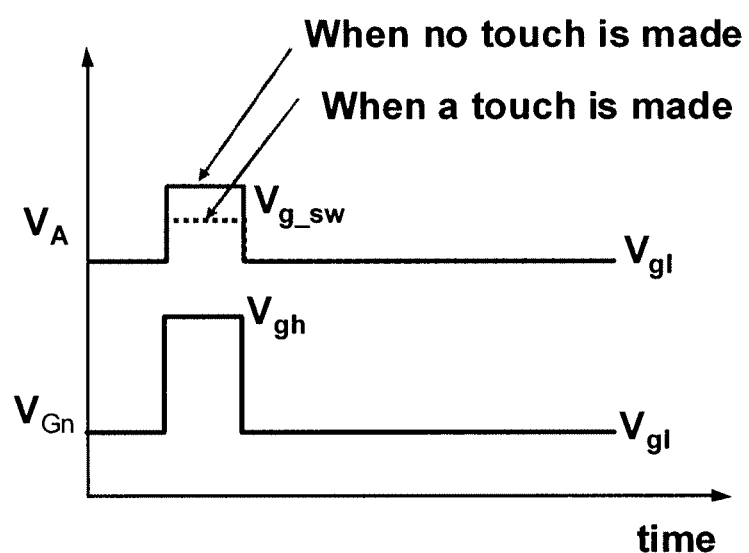
FIG. 4 illustrates a timing diagram showing a voltage vs. time of the circuit in FIG. 3 at the gate electrode and the A node.

FIG. 3 illustrates a circuit diagram of a liquid crystal display device in accordance with a preferred embodiment of the present invention and FIG. 4 illustrates a timing diagram showing a voltage vs. time of the circuit in FIG. 3 at the gate electrode and the A node.

Referring to FIG. 3, the liquid crystal display device includes a first substrate 100 (See FIG. 8) and a second substrate 200 (See FIG. 8) formed to face each other, a plurality of gate lines Gn 101 and data lines data 102 formed to cross each other on the first substrate 100 to define pixel regions, a pixel transistor Tpixel 151 formed on each of crossed portions of the gate lines Gn 101 and data lines data 102 and a pixel electrode (not shown) formed at each of the pixel regions, a common electrode formed on an entire surface of the second substrate 200 (See FIG. 8), a liquid crystal layer (not shown, See 300 in FIG. 8) filled between the first and second substrates 100 and 200, a liquid crystal capacitor Clc 152 formed between the pixel electrode and the common electrode 204, a storage line dds 140 formed on the first substrate 100, a switching line Gs 121 formed in parallel to the gate line Gn 101, a read out line ROIC parallel to the data line data 102, a first storage capacitor Cst1 153 formed between the storage line dds 140 and the pixel transistor Tpixel, a second storage capacitor Cst2 131 and a sensing capacitor Csen 132 formed in series between the switching line Gs 121 and the common electrode 204, and a switching transistor Tsw 133 having a gate electrode connected to a node A which is a contact point of the second storage capacitor Cst2 131 and the sensing capacitor Csen 132 and a drain electrode connected to the read out line. A source electrode of the switching transistor is connected to the storage line 140.

Formed in parallel to the second storage capacitor Cst2 131, and between the switching line Gs 121 and the switching transistor Tsw 133, there is a resistor 134. In this instance, a time constant $\{R1 \times (Csen+Cst2+Csw)\}$ defined with resistance value R1 of the resistor and capacitance values of the second storage capacitor Cst2, the sensing capacitor Csen and the switching transistor Csw is made to be smaller than one frame time period and greater than an on-time period of a high signal applied to the switching line Gs. This is for maintaining a touch sensing recognition longer than at least the on-time period of the switching transistor securely by maintaining a gate voltage value applied to the switching transistor Tsw 133 longer than the on-time period of the gate voltage signal applied to the switching transistor Tsw from the switching line 121.

The Csw denotes capacitance between the gate electrode and a channel of the switching transistor 133, Cst2 denotes capacitance of the second storage capacitor 131, and Csen denotes capacitance of the sensing capacitor 132.

One side electrode of the first storage capacitor 153 is the pixel electrode (not shown) and the other side electrode of the first storage capacitor 153 is the storage line 140. The storage line 140, which is a line having a voltage for driving the switching transistor 133 of the touch sensing unit applied thereto, may be formed, for an example, as a line on an outer side of the first substrate 100 parallel to the gate line additionally, or parallel to the gate line additionally.

The read out line ROIC, formed for sensing a current to the switching transistor Tsw 133, has an amplifier at a terminal thereof for amplifying the current sensed thus for improving sensitivity.

In the meantime, the second storage capacitor 131, the sensing capacitor 132, and the switching transistor 133 form a touch sensing unit which can be positioned at every pixel, or depending on cases, at a group of pixels spaced from each other. Preferably, at least one touch sensing unit is provided to an area of one touch spot.

The operation of the touch sensing unit will be described. At first, the node A is connected to a switching line 121 through R1 to apply a low voltage Vgl. If an nth switching line 121 is turned on, the gate voltage is changed from the low voltage Vgl to the high voltage Vgh, when the gate voltage of the switching transistor is as shown in FIG. 4.

That is, capacitance of the sensing capacitor Csen increases during the touch is made, dropping the gate voltage of a gate electrode side of the switching transistor Tsw to reduce the current to the read out line ROIC, accordingly. Therefore, whether the touch is made or not and a position of the touch can be known from a value per a unit time period of the current to the read out line.

In order to make a current to flow to the switching transistor Tsw at the time the high signal is applied to the switching line 121, the power source voltage Vdds applied to the storage line 140 is a positive DC voltage such that the switching transistor 133 Tsw turns on when the high signal is applied to the switching line, allowing the current to the switching transistor Tsw to flow to the read out line 115 ROIC, thereby sensing the current.

In an initial state, the low voltage Vgl (the same with the gate low voltage) is applied to the switching line 121 as the node A is connected to the switching line 121 through the resistor 134 R1. In this instance, the signal applied to the switching line 121 is scan pulses applied thereto line by line similar to the signal applied to the gate line. The gate voltage applied to a specific switching line 121 is changed from the gate low voltage Vgl to the gate high voltage Vgh. In this instance, a voltage applied to the gate voltage Vgs of the switching transistor Tsw can be expressed as follows.

$$V_A = \frac{C_{sen}}{C_{sen} + C_{st2}} V_{gl} + \frac{C_{st2}}{C_{sen} + C_{st2}} V_{gh}$$

Referring to FIG. 4, when the touch is made, a distance between the common electrode 204 and the node A is reduced at the touch point, increasing the capacitance Csen of the sensing capacitor 132 and dropping the gate voltage applied to the switching transistor 133, resulting to reduce the current to the read out line 115.

Eventually, from a value per unit time period of the current to the read out line 115, whether the touch is made or not and the position of the touch can be known. Taking a time when the current value is smaller than the initial state before the touch is made is a time the touch is made, it is determined that a case when the current value is similar to the initial state is a time when no touch is made. In this instance, the X-axis and Y-axis positions of the touched position are determined with the switching line and the read out line at which the sensing is made.

Figure 5:
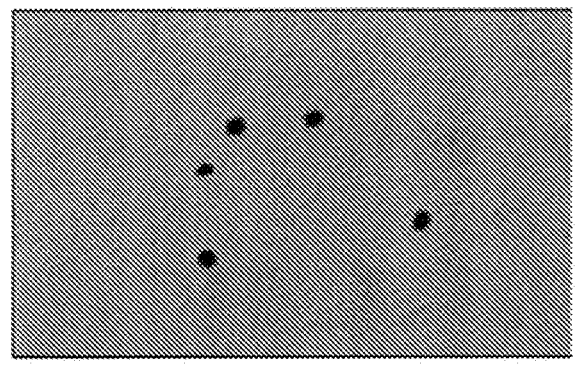
FIG. 5 illustrates a photograph of a multi-touch at the liquid crystal display device of the present invention having the circuit in FIG. 3.

FIG. 5 illustrates a photograph of a multi-touch at the liquid crystal display device of the present invention having the circuit in FIG. 3.

Referring to FIG. 5, it can be known that, when the multi-touch in which a plurality of points are touched is made to the liquid crystal display device of the present invention, detection of the plurality of points can be made exactly by the touch sensing units and the read out lines respectively connected thereto positioned in the pixels of the liquid crystal panel.

Second Embodiment

Figure 6:
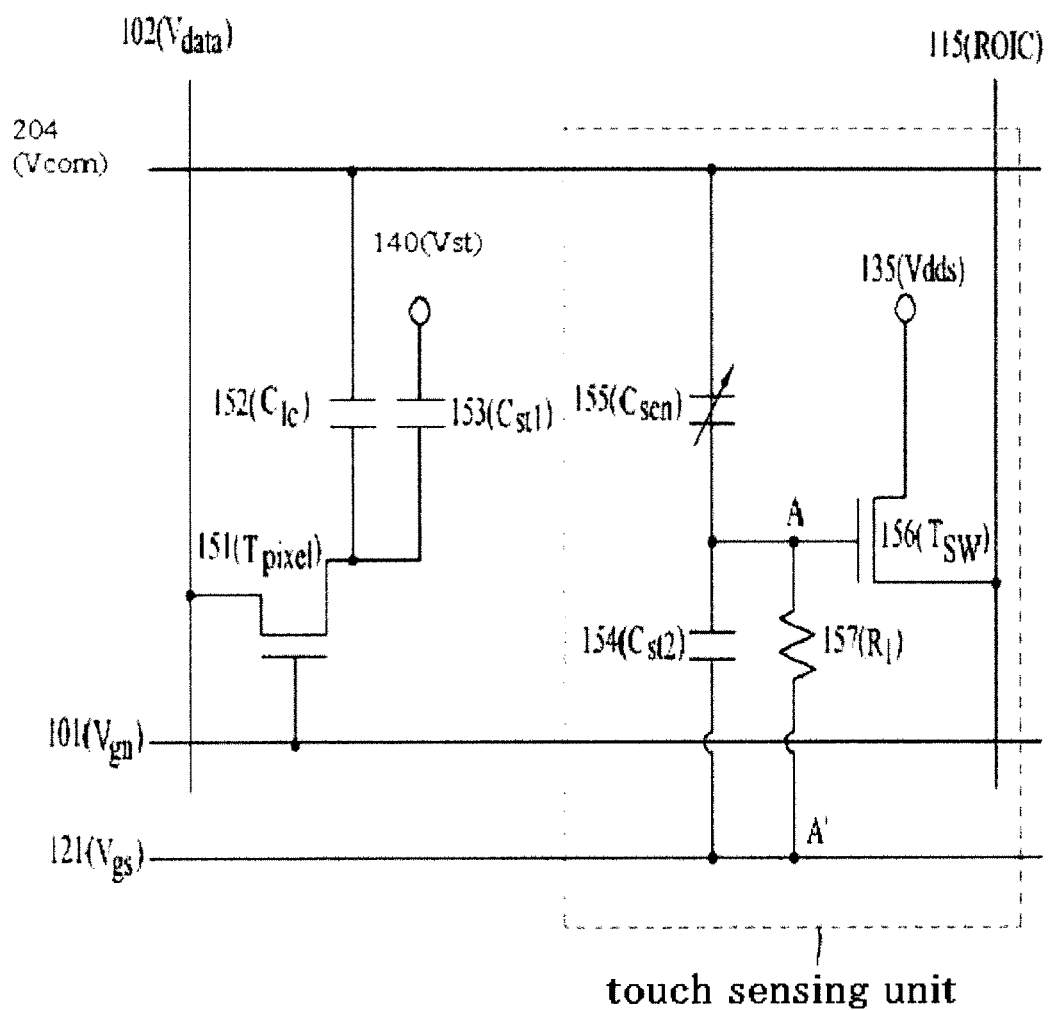
FIG. 6 illustrates a circuit diagram of a liquid crystal display device in accordance with a second embodiment of the present invention.

FIG. 6 illustrates a circuit diagram of a liquid crystal display device in accordance with a second preferred embodiment of the present invention.

Referring to FIG. 6, the liquid crystal display device in accordance with a second preferred embodiment of the present invention is identical to the liquid crystal display device in accordance with the first preferred embodiment of the present invention, except that a power source voltage line is connected to a source electrode side of the switching transistor Tsw separate from the storage line connected to the source electrode side of the switching transistor Tsw, for gain regulation of a voltage value projected through the read out line ROIC via the switching transistor Tsw on the touch sensing unit side. In this case, even if more power source voltage line is required separately, sensitivity of an output value read out of the touch sensing unit can be increased.

Third Embodiment

Figure 7:
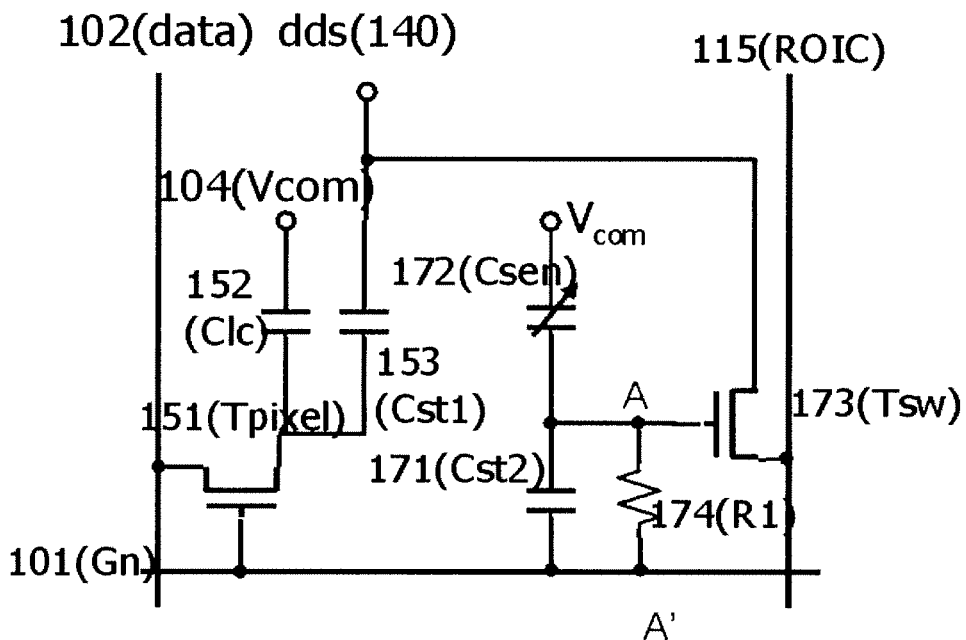
FIG. 7 illustrates a circuit diagram of a liquid crystal display device in accordance with a third embodiment of the present invention.

FIG. 7 illustrates a circuit diagram of a liquid crystal display device in accordance with a third preferred embodiment of the present invention.

Referring to FIG. 7, in comparison to the first embodiment, the liquid crystal display device shows an example in which the gate line Gn and the switching line Gs are formed with one line to share signals.

That is, the liquid crystal display device includes a first substrate 100 (See FIG. 8) and a second substrate 200 (See FIG. 8) facing each other, a plurality of gate lines 101 and data lines 102 formed to cross each other on the first substrate 100 to define pixel regions, a pixel transistor Vpixel 151 formed on each of crossed portions of the gate lines 101 and data lines 102 and a pixel electrode (not shown) formed at the pixel region, a common electrode 204 formed on an entire surface of the second substrate 200, a liquid crystal layer 300 (See FIG. 8) filled between the first and second substrates 100 and 200, a liquid crystal capacitor Clc 152 formed between the pixel electrode and the common electrode 204, a storage line dds 140 formed on the first substrate 100, a read out line ROIC 115 parallel to the data line 102, a first storage capacitor Cst1 153 formed between the storage line dds 140 and the pixel transistor Tpixel 151, a second storage capacitor Cst2 171 and a sensing capacitor Csen 172 formed in series between the gate line 101 and the common electrode 204, and a switching transistor Tsw 173 having a gate electrode connected to a node A which is a contact point of the second storage capacitor Cst2 171 and the sensing capacitor Csen 172 and a drain electrode connected to the read out line 115. A source electrode of the switching transistor Tsw 173 is connected to the storage line dds 140.

Formed in parallel to the second storage capacitor 171, and between the gate line 101 and the node A that is a gate electrode of the switching transistor 173, there is a resistor 174, additionally. As described before, a time constant defined with resistance value R1 of the resistor and capacitance values of the second storage capacitor Cst2, the sensing capacitor Csen and the switching transistor Csw is set to be smaller than one frame time period and greater than an on-time period of a gate high signal applied to the gate line for making detection of the touch within an adequate time period.

In this instance, the node A is connected to the gate line 101 through the resistor 171 to apply a gate low voltage Vgl. If an nth gate line is turned on, the gate voltage applied to the gate line 101 is changed from the gate low voltage Vgl to the gate high voltage Vgh, when the gate voltage Vg_sw of the switching transistor 173 Tsw can be expressed as follows.

$$V_{g\_sw} = \frac{C_{st2}}{C_{sen} + C_{st2} + C_{sw}} (V_{gh} - V_{gl}) + V_{gl}$$

Figure 8:
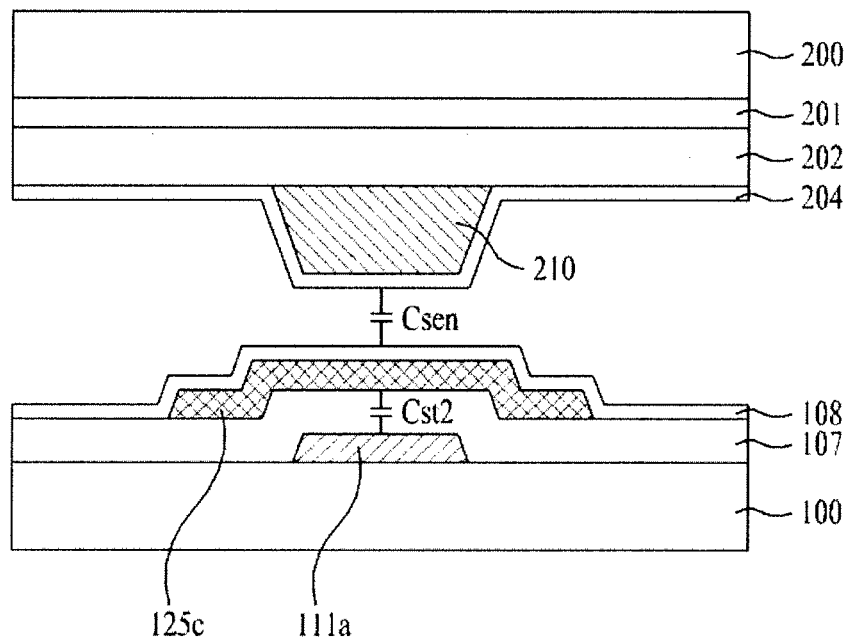
FIG. 8 illustrates a section of a sensing capacitor and a second storage capacitor in a liquid crystal display device of the present invention.

FIG. 8 illustrates a section of a sensing capacitor and a second storage capacitor in a liquid crystal display device of the present invention.

The sensing capacitor Csen of the liquid crystal display device of the present invention is defined with the common electrode 204 on the second substrate 200 and a metal pattern 125c on the first substrate 100 facing the second substrate 200. The metal pattern 125c is a pattern defined together with formation of the data line and the source/drain electrodes in a step of forming the pixel transistor and the switching transistors. Depending on cases, a semiconductor layer may be defined formed on an underside thereof.

The liquid crystal display device of the present invention will be described with reference to a sectional view of FIG. 8. The liquid crystal display device includes first and second substrates 100 and 200 facing each other, a liquid crystal layer 300 disposed therebetween, a black matrix layer 201 formed on the second substrate 200 opposite to a non-pixel region, a color filter layer 203 formed opposite to at least the pixel regions. Though it is shown that the color filter layer 203 is formed overlapped with the black matrix layer 201, depending on cases, the color filter layer 203 may be formed at a region excluding the black matrix layer 201.

The liquid crystal display device also includes a sensing capacitor 210 formed on the color filter layer 203 opposite to the metal pattern 125c to have a thickness not to be in contact with an uppermost surface on the first substrate 100 facing the second substrate 200, and a common electrode 204 to cover the sensing capacitor 210.

The sensing capacitor 210 is formed together with cell gap spacers (not shown) formed between the first and second substrates 100 and 200 for supporting a thickness of the liquid crystal layer 300. The sensing capacitor has a height formed relatively small.

A difference of a space between the sensing capacitor 210 and the metal pattern 125c caused by the touch enables to detect whether there is the touch or not. That is, at the time a charge stored in the sensing capacitor Csen is read out to the read out line through the switching transistor, whether the touch is made or not is detected with reference to a change of a charge value.

In the meantime, under the metal pattern 125c, there is a switching line 111a formed, with a gate insulating film 107 disposed between the metal pattern 125c and the switching line 111a. Depending on cases, alike the third embodiment, if the switching line 111a and the gate line are shared, the switching line Illa is replaced with the gate line.

To cover the metal pattern 125c, there is a protective film 108 formed additionally to form an uppermost surface of the first substrate 100.

In a case of the liquid crystal display device having above touch sensing unit, since, if one of the gate lines is turned on selectively, a current is sensed at a read out line of a relevant touch sensing unit, even if the read out line is provided in a data line direction selectively, all of the X, and Y positions can be detected according to a gate line having the current sensed.

In this instance, at the time a current is sensed at the switching transistor of the touch sensing unit, a reference of determining whether the touch is made or not is fixed taking parasitic capacitances of the devices provided to the liquid crystal display device into account. For an example, if an SN ratio (Signal to Noise Ratio) is high, though it can be determined that the touch is made at a 10~20% low level of a difference ΔCsen of the capacitance of the sensing capacitor, opposite to this, if the SN ratio is low, it can be determined that the touch is made at a 20% high level of a difference ΔCsen of the capacitance of the sensing capacitor. In the liquid crystal display device of the present invention, configurations of the touch sensing unit and the read out line are optimized, making the level of the parasitic capacitance low, elevating the SN ratio of the liquid crystal panel, it can be determined that the touch is made when the difference ΔCsen of the capacitance of the sensing capacitor is at a 10~20% level.

As has been described, the liquid crystal display device of the present invention has the following advantages.

First, the read out line formed only in a direction parallel to the data line in comparison to the capacitance type in which the read out lines formed both in the X and Y axis directions in the related art permits optimization of a structure and reduce parasitic capacitance between the interconnections, thereby enabling secure sensing of the touch owing to small parasitic capacitance in a large sized display device.

Second, the formation of the touch sensing unit as a unit with the liquid crystal panel permits to make touch sensing without a separate touch panel, and performance of a touch function, and the touch sensor built in the liquid crystal panel permits to fabricate a liquid crystal display device lighter and thinner than the related art liquid crystal display device and reduce a production cost.

Third, in formation of a sensing capacitor for sensing a touch, a common electrode is formed on the spacer in the liquid crystal cell and a structure on the lower substrate is changed to form a sensing capacitor. According to this, an additional step or enlargement of any part is required for defining the sensing capacitor.

Fourth, different from a photo type, the liquid crystal display device of the present invention can be used securely without being influenced from an external light.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A liquid crystal display device comprising:
    a first substrate and a second substrate formed to face each other;
    a plurality of gate lines and data lines formed to cross each other on the first substrate to define pixel regions;
    a pixel transistor formed on each of crossed portions of the gate lines and data lines data and a pixel electrode formed at each of the pixel regions;
    a common electrode formed on an entire surface of the second substrate;
    a liquid crystal layer filled between the first and second substrates;
    a liquid crystal capacitor formed between the pixel electrode and the common electrode;
    a storage line formed on the first substrate;
    a switching line formed in parallel to the gate line;
    a read out line parallel to the data line;
    a first storage capacitor formed between the storage line and the pixel transistor;
    a second storage capacitor and a sensing capacitor formed in series between the switching line and the common electrode;
    a switching transistor having a gate electrode connected to a contact point of the second storage capacitor and the sensing capacitor, and a drain electrode connected to the read out line; and
    a resistor formed between the switching line and the gate electrode of the switching transistor in parallel to the second storage capacitor,
    wherein a time constant is defined with a resistance value of the resistor and capacitance values of the second storage capacitor, the sensing capacitor and the switching transistor, the time constant is smaller than one frame time period and greater than an on-time period of a high signal applied to the switching line.

2. The liquid crystal display device according to claim 1, wherein the switching transistor includes a source electrode connected to the storage line.

3. The liquid crystal display device according to claim 1, wherein the switching transistor includes a source electrode connected to a separate power source voltage line.

4. The liquid crystal display device according to claim 1, further comprising a sensing spacer formed on the common electrode spaced from an uppermost surface on the first substrate, the sensing spacer is formed at a portion where the sensing capacitor is defined.

5. A liquid crystal display device comprising:
   a first substrate and a second substrate formed to face each other;
   a plurality of gate lines and data lines formed to cross each other on the first substrate to define pixel regions;
   a pixel transistor formed on each of crossed portions of the gate lines and data lines and a pixel electrode formed at each of the pixel regions;
   a common electrode formed on an entire surface of the second substrate;
   a liquid crystal layer filled between the first and second substrates;
   a liquid crystal capacitor formed between the pixel electrode and the common electrode;
   a storage line formed on the first substrate;
   a read out line parallel to the data line;
   a first storage capacitor formed between the storage line and the pixel transistor;
   a second storage capacitor and a sensing capacitor formed in series between the gate line and the common electrode;
   a switching transistor having a gate electrode connected to a contact point of the second storage capacitor and the sensing capacitor, and a drain electrode connected to the read out line; and
   a resistor formed between the gate line and the gate electrode of the switching transistor, in parallel to the second storage capacitor,
   wherein a time constant is defined with a resistance value of the resistor and capacitance values of the second storage capacitor, the sensing capacitor and the switching transistor, the time constant is smaller than one frame time period and greater than an on-time period of a gate high signal applied to the gate line.

6. The liquid crystal display device according to claim 5, wherein the switching transistor includes a source electrode connected to the storage line.

* * * * *